United States Patent
Leung et al.

(10) Patent No.: US 12,129,995 B2
(45) Date of Patent: Oct. 29, 2024

(54) SYSTEMS AND METHODS FOR CONTROLLING DECORATIVE LIGHTING

(71) Applicant: POLYGROUP MACAU LIMITED (BVI), Tortola (VG)

(72) Inventors: Chi Yin Alan Leung, Apleichau (HK); Chi Kin Samuel Kwok, Shenzhen (CN); Eric Szweda, Hong Kong (HK)

(73) Assignee: POLYGROUP MACAU LIMITED (BVI), Road Town (VG)

( * ) Notice: Subject to any disclaimer, the term of this patent is extended or adjusted under 35 U.S.C. 154(b) by 49 days.

(21) Appl. No.: 17/811,599

(22) Filed: Jul. 11, 2022

(65) Prior Publication Data
US 2022/0341576 A1 Oct. 27, 2022

Related U.S. Application Data

(63) Continuation-in-part of application No. 17/329,736, filed on May 25, 2021, now Pat. No. 11,460,179,
(Continued)

(51) Int. Cl.
| | |
|---|---|
| *F21V 23/00* | (2015.01) |
| *F21S 4/10* | (2016.01) |
| *F21V 23/02* | (2006.01) |
| *H05B 45/10* | (2020.01) |
| *H05B 45/20* | (2020.01) |
| *H05B 45/40* | (2020.01) |
| *H05B 47/155* | (2020.01) |
| *F21W 121/04* | (2006.01) |
| *F21Y 103/10* | (2016.01) |

(Continued)

(52) U.S. Cl.
CPC .............. *F21V 23/003* (2013.01); *F21S 4/10* (2016.01); *F21V 23/00* (2013.01); *F21V 23/001* (2013.01); *F21V 23/02* (2013.01); *H05B 45/10* (2020.01); *H05B 45/20* (2020.01); *H05B 45/40* (2020.01); *H05B 47/155* (2020.01); *F21W 2121/04* (2013.01); *F21Y 2103/10* (2016.08); *F21Y 2113/17* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 6,285,140 B1 * | 9/2001 | Ruxton | H05B 45/31 315/315 |
| 10,028,360 B1 | 7/2018 | Chen | |

(Continued)

OTHER PUBLICATIONS

Office Action for U.S. Appl. No. 16/967,575 dated Jul. 6, 2021, pp. 16-24.

*Primary Examiner* — Anh Q Tran
(74) *Attorney, Agent, or Firm* — GREENBERG TRAURIG LLP; Trenton A. Ward

(57) ABSTRACT

A decorative lighting system including a sensor device; a wiring harness comprising an insulated conductor and a plurality of lighting elements; a controller in communication with the wiring harness and the sensor device, the controller comprising a processor, a memory, and a wireless communication module; and wherein the controller is configured to control the plurality of lighting elements based at least in part on information received from the sensor device.

25 Claims, 12 Drawing Sheets

Related U.S. Application Data which is a continuation of application No. 16/940,985, filed on Jul. 28, 2020, now Pat. No. 11,019,692, which is a continuation-in-part of application No. 16/559,007, filed on Sep. 3, 2019, now Pat. No. 10,728,978, which is a continuation of application No. 15/901,037, filed on Feb. 21, 2018, now Pat. No. 10,440,795, which is a continuation of application No. 15/448,223, filed on Mar. 2, 2017, now Pat. No. 9,907,136.

(60) Provisional application No. 62/303,603, filed on Mar. 4, 2016.

(51) Int. Cl.
*F21Y 113/17* (2016.01)
*F21Y 115/10* (2016.01)

(56) References Cited

U.S. PATENT DOCUMENTS

| | | |
|---|---|---|
| 10,440,795 B2 | 10/2019 | Leung et al. |
| 10,728,978 B2 | 7/2020 | Leung et al. |
| 11,019,692 B2 | 5/2021 | Leung et al. |
| 2009/0218952 A1 | 9/2009 | Tang |
| 2015/0102731 A1* | 4/2015 | Altamura ............ A47G 33/0836 315/152 |
| 2015/0359066 A1* | 12/2015 | Loomis .................. H05B 45/20 362/123 |
| 2016/0330823 A1* | 11/2016 | Hwa ...................... H05B 47/19 |

\* cited by examiner

SYSTEMS AND METHODS FOR CONTROLLING DECORATIVE LIGHTING

CROSS-REFERENCE TO RELATED APPLICATIONS

This application is a continuation-in-part of application Ser. No. 17/329,736, filed on May 25, 2021, which is a continuation of Ser. No. 16/940,985, filed on Jul. 28, 2020, which is a continuation of application Ser. No. 16/559,007, filed on Sep. 3, 2019, now U.S. Pat. No. 10,728,978, which is a continuation of application Ser. No. 15/901,037, filed on Feb. 21, 2018, now U.S. Pat. No. 10,440,795, which is a continuation of application Ser. No. 15/448,223, filed on Mar. 2, 2017, now U.S. Pat. No. 9,907,136. The entire contents of all of the above-mentioned patent applications are expressly incorporated by reference in their entirety.

TECHNICAL FIELD

The disclosed technology relates generally decorative lighting systems, and in particular to lighting systems having sensors control the light settings of the decorative lights.

BACKGROUND

As part of holiday celebrations, it is custom to decorate trees, garland, wreaths, and other decorative items with lights. Many types of lights are used to decorate these items, including incandescent, fiber optic, and light-emitting diode (LED) lights. Depending on certain inputs from an ambient environment (e.g., brightness, sound, etc.) of a decorative lighting system, there may be a desire to control the decorative lights. However, manually adjusting the decorative lights can be time consuming and burdensome. Thus, there is a need to provide a decorative lighting system that may automatically control decorative lights based in pan on inputs from the ambient environment.

BRIEF SUMMARY

In an embodiment, a decorative lighting system may include a power cord comprising (i) a conductor and (ii) a power plug; a sensor device; a wiring harness comprising an insulated conductor and a plurality of lighting elements; and a controller in communication with the wiring harness and the sensor device, the controller comprising a processor, a memory, and a wireless communication module.

In an embodiment, a method of controlling the brightness of a decorative lighting system may include detecting an input of an ambient environment; receiving the detected input; determining, based on the detected input, an appropriate light setting for a plurality of lighting elements; determining an output to achieve the appropriate light setting; and delivering the output to the plurality of lighting elements through a wiring harness.

The foregoing summarizes only a few aspects of the present disclosed technology and is not intended to be reflective of the full scope of the present disclosed technology. Additional features and advantages of the present disclosed technology are set forth in the following detailed description and drawings, may be apparent from the detailed description and drawings, or may be learned by practicing the present disclosed technology. Moreover, both the foregoing summary and following detailed description are exemplary and explanatory and are intended to provide further explanation of the presently disclosed technology as claimed.

BRIEF DESCRIPTION OF THE DRAWINGS

The accompanying drawings constitute a part of this specification and serve to illustrate certain implementations of the disclosed technology. The drawings are not intended to limit the scope of the presently disclosed subject matter in any manner.

DETAILED DESCRIPTION

Figure 1:
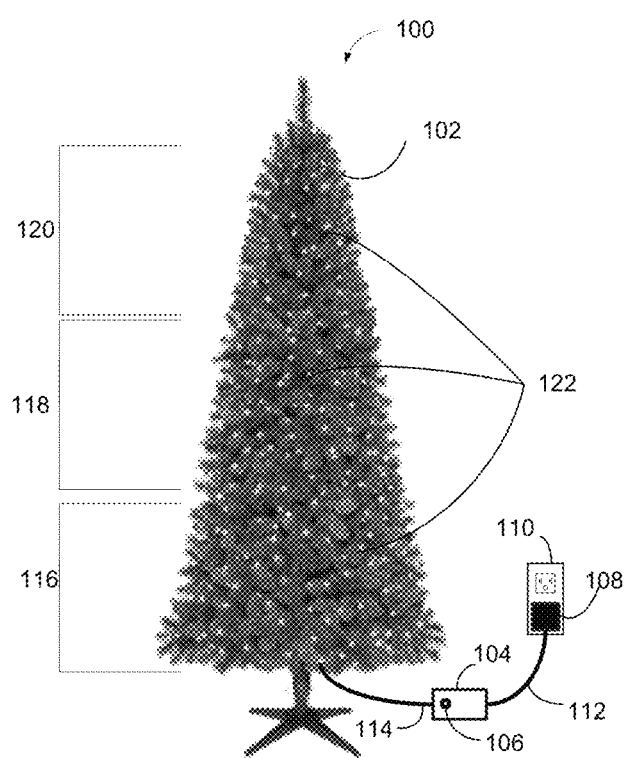
FIG. 1 depicts an assembled artificial Christmas tree having an installed decorative lighting system that includes one or more light strings containing light emitting diode (LED) lamps, in accordance with certain example implementations of the disclosed technology.

Although preferred embodiments of the disclosed technology are explained in detail, it is to be understood that other embodiments are contemplated. In particular, while LED lamps are disclosed in embodiments of the disclosed technology, a person having ordinary skill in the art would understand that any suitable type of lighting may be used with the decorative lighting system described herein. In addition to LED lamps, embodiments of the decorative lighting system may include incandescent, fiber optic, LED, or other suitable lights.

Accordingly, it is not intended that the disclosed technology is limited in its scope to the details of construction and arrangement of components set forth in the following description or illustrated in the drawings. The disclosed technology is capable of other embodiments and of being practiced or carried out in various ways. In describing the preferred embodiments, specific terminology will be resorted to for the sake of clarity.

It should be noted that, as used in the specification and the appended claims, the singular forms "a," "an" and "the" include plural references unless the context clearly dictates otherwise. References to a composition containing "a" constituent is intended to include other constituents in addition to the one named.

In describing the preferred embodiments, each term used contemplates its broadest meaning as understood by those skilled in the art and includes all technical equivalents, which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

To facilitate an understanding of the principles and features of the disclosed technology, various illustrative embodiments are explained below. In particular, the presently disclosed subject matter is described in the context of being an artificial tree lighting system. The present disclosed technology, however, is not so limited, and can be applicable in other contexts. For example, some embodiments of the present disclosed technology may improve other decorative lighting systems, such as light poles, lamps, extension cord systems, power cord connection systems, and the like. These embodiments are contemplated within the scope of the present disclosed technology. Accordingly, when the present disclosed technology is described in the context of a decorative lighting system for an artificial Christmas tree, it will be understood that other embodiments can take the place of those referred to herein.

Certain embodiments of the disclosed technology may include one or more decorative lighting systems. Certain example implementations of the decorative lighting systems may be integrated with an artificial tree. In other example implementations, the decorative lighting systems disclosed herein may be embodied as stand-alone lighting strings that may be used with any object or for illumination of an area at the discretion of the user.

FIG. 1 depicts an artificial Christmas tree assembly 100, according to an example implementation of the disclosed technology. Certain example implementations of the assembly 100 can include a tree 102 having installed thereon a decorative lighting system with one or more light strings that include a plurality of light emitting diode (LED) lamps. In one example implementation, the decorative lighting system may include one or more white LED light strings and one or more variable-color LED light strings. Certain example implementations may include just the variable-color LED light strings.

FIG. 1 depicts various LED light strings 122 distributed respectively in bottom, middle, and top segments 116, 118, 120 of the tree 102. In some embodiments, the LED light strings 122 distributed in a particular segment (e.g., 116) may be separately and independently controllable from the LED light strings 122 distributed in another segment (e.g., 118 or 120). The LED light strings 122 distributed to a particular segment may include all white LEDs, all RGB LEDs, or a combination of both. In other example implementations, each of the LED light strings 122 may overlap and/or be uniformly distributed over the tree, and not necessarily restricted to corresponding bottom, middle, and top segments 116, 118, 120 of the tree 102 as depicted. In certain example implementations, the LED light strings 122 may include various combinations of white LED bulbs and variable-color LED bulbs, but the LED light strings 122 may also be exclusively white or variable-color.

In accordance with an example implementation of the disclosed technology, the artificial Christmas tree assembly 100 may include a controller 104 in communication with the LED light strings 122. For example, a wiring harness 114 having two or more insulated conductors may connect the controller 104 to the LED lamp housings associated with LED light strings 122 to provide at least power and ground to the associated LEDs. The controller 104 may include a selector switch or button 106 for controlling the desired lighting mode. For example, a user may toggle the button 106 to select any combination of the (1) RGB LED illumination sequence; (2) the white LED illumination; and/or (3) both the RGB LED illumination sequence and the white LED illumination. As will be discussed with respect to FIG. 2 and FIG. 4 below, the controller 104 may also provide a control signal for resetting a "color show" sequence of the RGB LEDs in the decorative lighting system.

In accordance with an example implementation of the disclosed technology, the wiring harness 114 may provide various series/parallel wiring configurations for powering and controlling the individual LED lamps in the LED light strings 122. For example, the LEDs in each of the LED light strings 122 may individually be wired in series such that removal or opening of one of the LED circuits may interrupt power to a fraction or all of the other LEDs in that corresponding portion (for example, so that the user can be visually alerted to a missing or defective lamp assembly). In certain example implementations, the LED light strings 122 may be wired in parallel via the wiring harness 114 so that missing lamps (or other power/conductivity issues) associated with one portion does not interrupt power to the other portions. In this way, a power distribution problem in one of the LED light strings 122 may be isolated to one of the portions without causing the LEDs in the other portions to turn off.

As depicted in FIG. 1, a power cord 112 may connect power from a power outlet 110 to the controller 104. In certain example implementations, a power adapter 108 may be used between the power outlet 110 and the controller 104, for example, to transform and/or rectify alternating current power received from the power outlet 110 and to provide power to the controller 104. In certain example implementations, one or more of the functions associated with the power adapter 108 (such as transforming voltage, rectifying AC to DC, filtering ripple, switching power, or other functions) may be handled within the controller 104. For example, the power adapter 108 may include a transformer to transform 110 volt AC to a lower AC voltage (for example, approximately 10-15 volts AC). In an example implementation, the transformed AC power received from the power adapter 108 may be rectified within the controller 104. In yet other example implementations, the power adapter 108 may provide all of the transforming and rectifying and may provide an appropriate regulated DC voltage to the controller 104. Such schemes to modify and provide electrical power to circuits are well known to those having average skill in the art and will not be further discussed herein in the interest of brevity.

Figure 2:
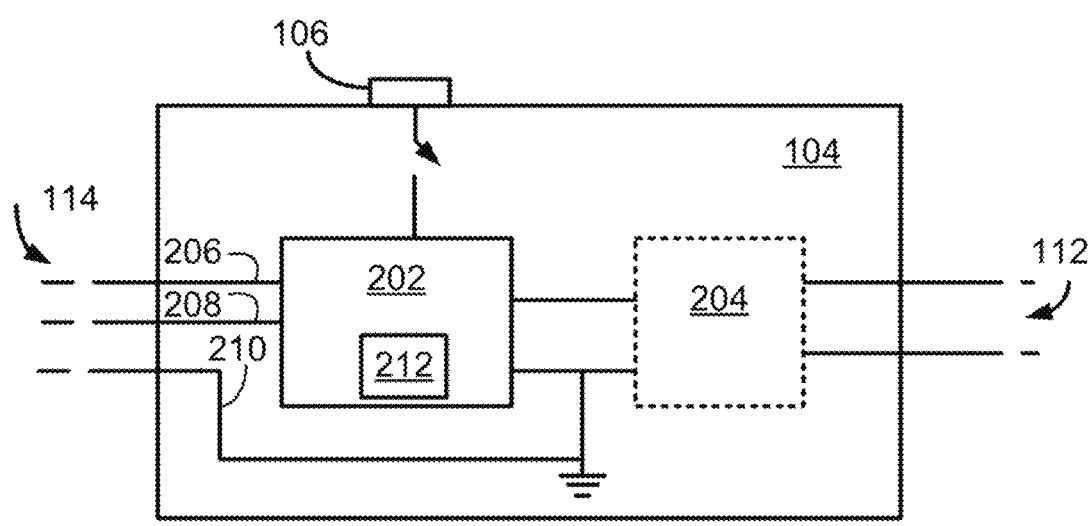
FIG. 2 is a block diagram of an example controller for use in a decorative lighting system, such as depicted in FIG. 1.

FIG. 2 is a block diagram of an example controller 104 for use in a decorative lighting system, such as depicted in the decorative lighting system 100 in FIG. 1. In accordance with an example implementation of the disclosed technology, power may be supplied by a power cord 112.

As discussed above, the power cord 112 may provide alternating current that may need to be further rectified (e.g., by an optional power rectification/filtering circuit 204). In another example implementation, the power cord 112 may provide the proper direct current for operation of a control processor 202. In certain example implementations, the control processor 202 may be in communication with a user controllable switch or button 106 that may be pressed to select a particular mode of operation. For example, the controller 104 may allow a user to select (by pressing the button 106), any combination of the (1) RGB LED illumination sequence; (2) the white LED illumination; and/or (3) both the RGB LED illumination sequence and the white LED illumination.

In accordance with an example implementation of the disclosed technology, the output of the control processor 202 associated with the controller 104 may be in communication with the wiring harness 114 for distribution of energizing power and/or control signals to the various LEDs (and/or other lamps or accessories) associated with the decorative lighting system. In one example implementation, the output of the control processor 202 may include a common or ground return 210 and one or more energizing and/or control signal outputs 206, 208. In an example implementation where the decorative lighting system includes both white LED light strings and variable-color LED light strings, it may be desirable to independently energize or turn off the respective light strings. Thus, according to an example implementation, a first signal energizing and/or control signal output 206 may be used to independently turn on, turn off, and provide a light show reset signal for the variable-color LED light strings, while a second signal energizing and/or control signal output 208 may be used to independently turn on and turn off the white LED light strings, for example, based on the mode selected via the button 106.

In accordance with an example implementation of the disclosed technology, the control processor 202 may include a timing/reset circuit 212. In certain example implementations, and as will be discussed in detail below, the timing/reset circuit 212 may be configured to provide a periodic reset signal to the LED (and in particular, to embedded ICs within the RGB LED lamps) via one or more of the control signal outputs 206, 208.

Figure 3:
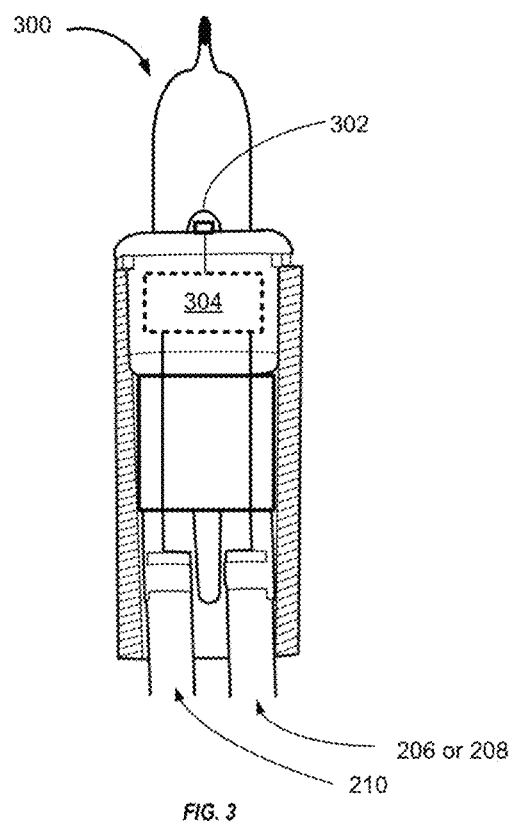
FIG. 3. depicts a white LED lamp for use in a decorative lighting system, such as depicted in FIG. 1.

FIG. 3 depicts a white LED lamp (or bulb) 300 for use in a decorative lighting system, such as depicted in FIG. 1. According to an example implementation, the white LED light strings of the decorative lighting system may employ such LED lamps 300 having an embedded LED 302. Other LED lamps for use in the disclosed decorative lighting system, such as LED lamps having more or less LEDs, or other options, are to be considered included in this disclosure, and the discussed white LED lamps are not intended to limit the scope of the disclosed technology to these specific number of LED elements within the lamps.

In an example implementation, the white LED lamps 300 can include embedded integrated circuit (IC) 304 inside each LED lamp 300. The embedded IC 304 can be configured to turn on and off the LED based on the mode selected via the button 106. In certain example implementations, the intensity or brightness of each LED can be individually controlled by the IC 304. In certain example implementations, the brightness of the LED may be controlled by pulse-width-modulation (PWM) output from the embedded IC 304.

Figure 4:
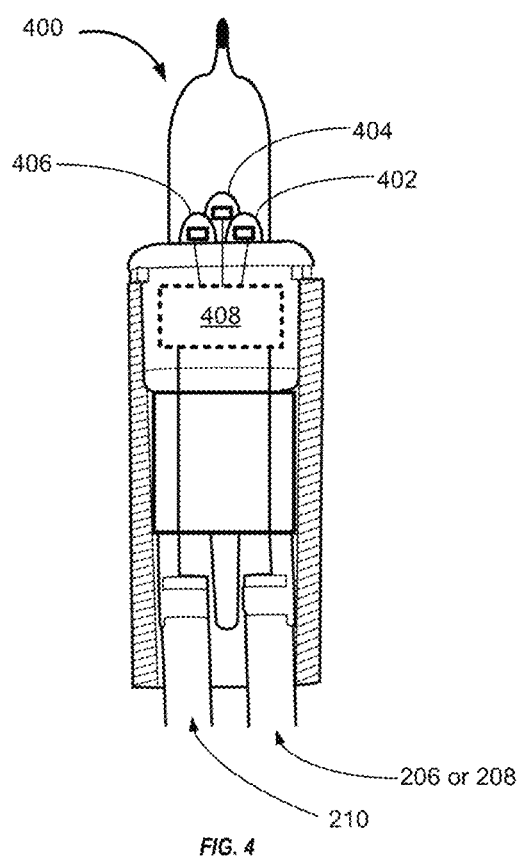
FIG. 4 depicts a multi-color (variable-color) LED lamp for use in a decorative lighting system, such as depicted in FIG. 1.

FIG. 4 depicts a multi-color LED lamp (or bulb) 400 for use in a decorative lighting system, such as depicted in FIG. 1. According to an example implementation, the variable-color LED light strings of the decorative lighting system may employ such LED lamps 400 having a plurality of embedded LEDs 402, 404, 406. In one example implementation, the plurality of embedded LEDs can include Red 402, Green 404, and Blue 406 (RGB) LEDs. Other LED lamps for use in the disclosed decorative lighting system, such as having different colors, more or less colors, or other options, are to be considered included in this disclosure, and the discussed RGB LED lamps are not intended to limit the scope of the disclosed technology to these specific colors or number of LED elements within the lamps.

In an example implementation, the (color) RGB LED bulbs 400 include an embedded integrated circuit (IC) 408 inside each LED lamp 400. The embedded IC 408 can be configured to communicate with and individually control the energizing of each of the corresponding RGB LEDs to create a multitude of different colors and color combinations. In certain example implementations, the embedded IC 408 can be configured to run a pre-programmed sequence for independently energizing the associated LEDs within the lamp 400 to produce the different colors without requiring any additional connections to the lamp socket besides power and ground (for example, as provided via the wiring harness 114).

According to an example implementation of the disclosed technology, once the variable-color LED light string is powered, the embedded ICs 408 within each RGB LED lamp 400 may be configured to initiate and control a sequence of illuminating colors that can vary with time. In certain example implementations, the intensity or brightness of each RGB LED 402, 404, 406 can be individually controlled by the IC 408. In certain example implementations, the brightness of the LEDs may be controlled by PWM output from the embedded IC 408. In other example implementations, the color of the lamp 400 may be determined by varying the PWM output from the embedded IC 408 to each RGB LED 402, 404, 406.

Figure 5:
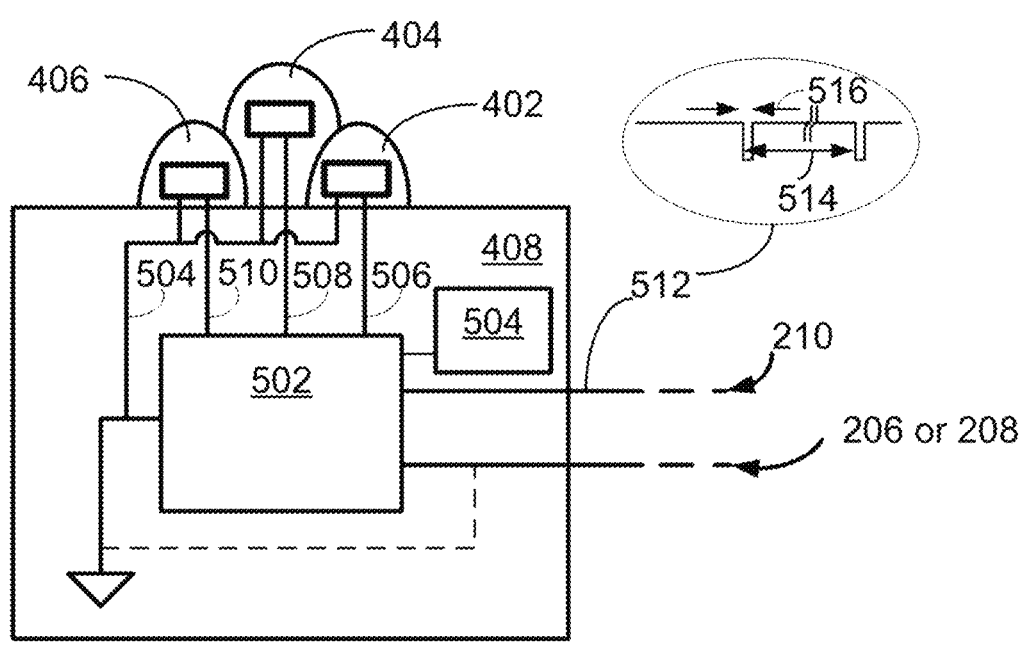
FIG. 5 is a block diagram depiction of the multi-color LED lamp, such as depicted in FIG. 3, having a built-in processor or embedded integrated circuit (IC) and may be configured for communication with the controller as depicted in FIG. 2.

FIG. 5 is a block diagram depiction of a multi-color LED lamp, such as depicted in FIG. 4, having a built-in or embedded IC 408 and configured for communication with a controller (such as the controller 104 as depicted in FIG. 2). In certain example implementations, the IC 408 may include a processor 502 and a memory 504 in communication with the processor 502. The memory 504, for example, may store non-volatile data, such as light show programming information, timing, or other information for controlling the illumination of the associated LEDs 402, 404, 406.

In accordance with an example implementation of the disclosed technology, the processor 502 may include (or be in communication with) an output driver section (not shown) for providing drive current to the LEDs 402, 404, 406 via respective circuit paths 504, 506, 508, 510. In one example implementation, a common return path 504 may be provided. In certain example implementations, the return path 504 may be connected to the ground connection of the wiring harness 114, either directly, or indirectly.

In accordance with an example implementation of the disclosed technology, and as shown in the upper right hand portion of FIG. 5, a power/signal conductor 512 associated with the wiring harness 114 may provide selectable power and a control/reset signal to the embedded IC 408. In one example implementation, the power may be interrupted periodically 514 (such as every few minutes) for a short duration 516 (such as several milliseconds) to essentially reset the sequencing program running on the processor 502 so that it periodically 514 starts the light show sequence over. This feature of periodically providing a reset to the processor 502 of the embedded IC 408 in each RGB LED lamp may provide certain benefits such as, for example, enabling certain cost savings associated with the production and use of certain RGB LED lamps, as will be further explained below.

According to certain example implementations of the disclosed technology, the timing associated with the RGB LED illumination sequence may be controlled by a counter in the processor 502 of the embedded IC 408 within each RGB LED. In certain example implementations, the electronic controller (such as the controller 104 as shown in FIG. 1 and FIG. 2) may be in communication with the embedded IC 408 associated with each RGB LED to provide the periodic 514 reset 516 signal to cause the embedded ICs to reset and restart the RGB LED illumination sequence after a predetermined period, as discussed above.

In certain example implementations, the operating frequency of the counter in the embedded IC 408 may vary as a function of a number of factors including, but not limited to, temperature, circuit capacitance, resistance, manufacturing variables, or other factors. Due to certain size and cost parameters, it may not be feasible or desired to add a crystal oscillator to the circuit to improve the stability of the counter frequency (or uniformity of the frequency from unit to unit). Thus, in certain instances, when several of the RGB LEDs are energized at the same time, thereby initiating the same programmed light show sequence on each unit, the light show sequence from unit to unit may gradually lose synchronization due to the differences in the individual counter/clock frequencies that control the sequences on the individual RGB LEDs. Thus, according to an example implementation, the periodic reset from the controller 104 is provided to re-synchronize the light show at predetermined intervals. In one example implementation, upon power-up or reset, the RGB LED may start the sequence by illuminating Red lights and then migrate to Blue and then Green, at which time the controller 104 may provide a reset to start the sequence over after a predetermined period 514.

Figure 6:
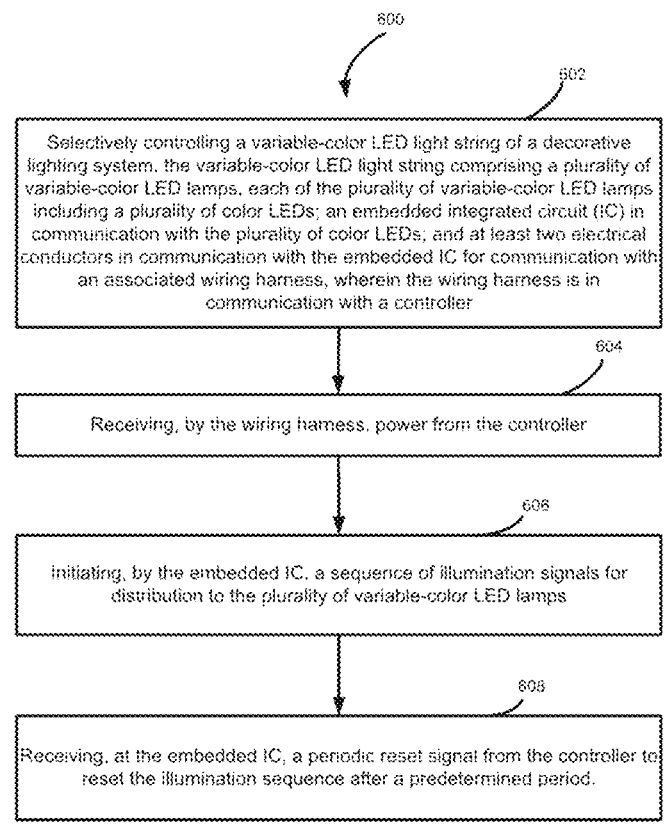
FIG. 6 is a method flow diagram, according to an example implementation of the disclosed technology.

FIG. 6 is a flow diagram of a method 600, according to an example implementation of the disclosed technology. The method 600 includes selectively controlling 602 a variable-color LED light string of a decorative lighting system, the variable-color LED light string comprising a plurality of variable-color LED lamps, each of the plurality of variable-color LED lamps a plurality of color LEDs; an embedded IC in communication with the plurality of color LEDs; at least two electrical conductors in communication with the embedded IC for communication with an associated wiring harness, wherein the wiring harness is in communication with a controller. The method 600 can further include selectively controlling 604 the variable-color LED light string by receiving, by the wiring harness, power from the controller. Additionally, the method 600 can include selectively controlling 606 the variable-color LED light string by initiating, by the embedded IC, a sequence of illumination signals for distribution to the plurality of variable-color LED lamps. Finally, the method 600 can include selectively controlling 608 the variable-color LED light string by receiving, at the embedded IC, a periodic reset signal from the controller to reset the illumination sequence after a predetermined period.

Figure 7A:
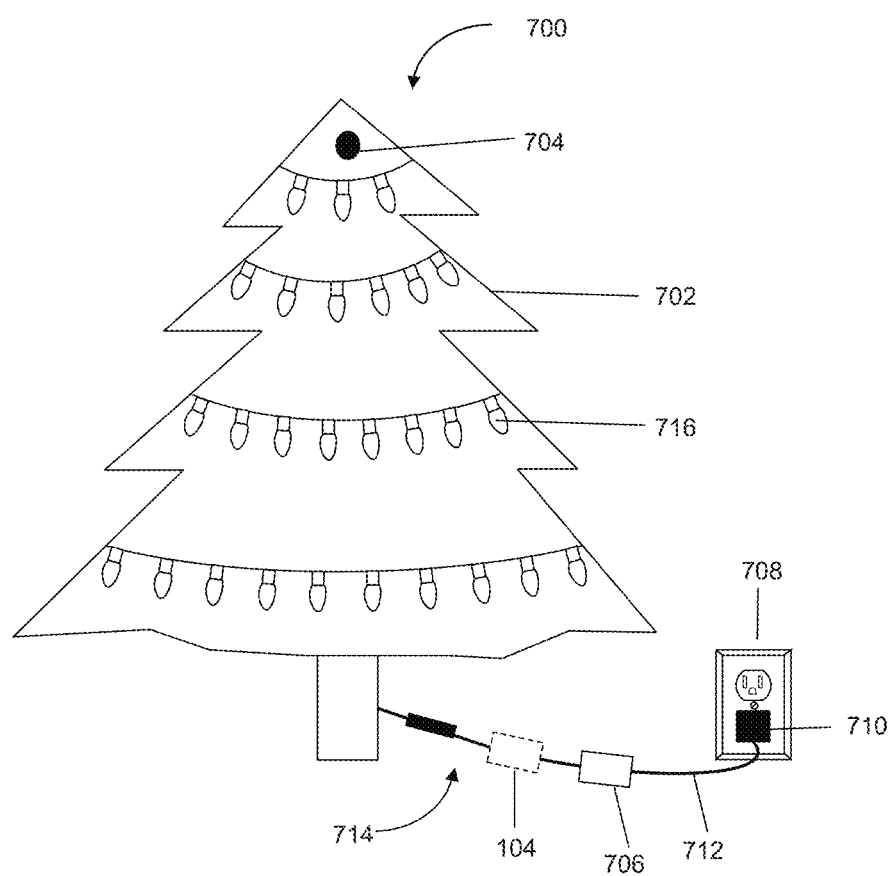
FIG. 7a illustrates an assembled artificial tree having an installed decorative lighting system that includes a sensor device, in accordance with certain example implementations of the disclosed technology.

FIG. 7a depicts an artificial tree assembly 700, according to an example implementation of the disclosed technology. Certain example implementations of the assembly 700 can include a tree 702 having installed thereon a decorative lighting system with a wiring harness 714 that includes a plurality of lighting elements 716. As discussed above, any suitable type of lighting may be used to form the plurality of lighting elements 716. For example, the plurality of lighting elements 716 may include incandescent, fiber optic, or LED lights. In certain example implementations, the plurality of lighting elements 716 may include white LED lamps 300, multi-color LED lamps 400, or a combination of the two. In certain example implementations, the section of the wiring harness 714 with the plurality of lighting elements 716 may be permanently secured to the branches of the tree 702 using a variety of suitable attachment methods known to those of ordinary skill in the art. In other example implementations, the wiring harness 714 may be removeable from the tree 702, enabling a user to use the wiring harness 714 that includes the plurality of lighting elements 716 with other assemblies such as those discussed below for FIGS. 7b and 7c.

As depicted in FIG. 7a, the tree assembly 700 may include a sensor device 704. In accordance with an example implementation of the disclosed technology, the tree assembly 700 may include a controller 706 in communication with the sensor device 704. In accordance with an example implementation of the disclosed technology, the sensor device 704 may communicate information to the controller 706, and the controller 706 may control the plurality of lighting elements 716 or other aspects of the tree assembly 700 based in part on the information received from the sensor device 704.

In example implementations, the sensor device 704 may include any suitable sensor or combination of suitable sensors capable of providing data or information regarding the surrounding environment, user input, or other variables. For example, the sensor device 704 may include optical sensors, audio sensors, and/or thermal sensors. In certain example implementations, the sensor device 704 may be able to detect various inputs from an ambient environment of the tree assembly 700. For example, the sensor device 704 may detect luminous intensity, human movement, sound, and/or temperature in a room of a house containing a tree assembly 700. In accordance with an example implementation of the disclosed technology, the sensor device 704 may include an optical sensor and/or a thermal sensor each positioned on the top half of the tree 702 to allow for accessible scanning of the ambient environment of the tree 702. In other example implementations of the disclosed technology, the sensor device 704 may include an audio sensor positioned at the base of the tree 702. In yet another example implementation, the sensor device 704 may include multiple sensor components. In an example implementation, the sensor device 704 can include three separate sensors, including an optical sensor positioned on the top of the tree 702, an audio sensor positioned at the base of the tree 702, and a thermal sensor positioned between the optical sensor and the audio sensor on the tree 702. In this implementation, the controller 706 may receive information from the optical sensor, audio sensor, and thermal senor of the sensor device 704.

In accordance with an example implementation, the controller 706 may be configured to receive and process information from the sensor device 704, including optical, thermal, sound, and signal data, simultaneously. The controller 706 and the sensor device 704 may communicate with each other through a wired connection or wireless connection. For example, the controller 706 may communicate with the sensor device 704 using any one or more of the following: buses, networks, and other wired or wireless interconnection and communication technologies. In example implementation, the sensor device 704 can wirelessly communicate with the controller 704 via a Bluetooth connection. In another implementation, the sensor device 704 can wirelessly communicate with the controller 704 via a Wi-Fi connection or similar wireless communication. Alternatively, the sensor device 704 and the controller 706 can be wirelessly connected via Wi-Fi to a router for communication purposes. Further, in an alternative embodiment, the sensor device 704 is connected to the controller 706 via a wired connection that may provide both power and an information link. In certain example implementations, the controller 706 may be configured to control light settings for the plurality of lighting elements 716 based in part on information received from the sensor device 704. The light settings may include brightness, color, illumination sequence (i.e., a sequence of illuminating colors that may vary with time), light patterns including strobing and flashing of the lights, and/or power settings. In certain example implementations of the disclosed technology, the controller 706 may communicate with the plurality of lighting elements 716 through a wiring harness 714. For example, the wiring harness 714 may have an insulated conductor that connects the controller 706 to the plurality of lighting elements 716 to provide at least power and ground to the plurality of lighting elements 716.

In accordance with an example implementation of the disclosed technology, a user may interact with the controller 706. For example, a user may configure the controller 706 by using a mobile device application, remote control, or other similar wireless device. In one embodiment, the mobile device application can be run on a mobile phone and be used to communicate with, configure, and control the settings and operation of the controller 706. Alternatively, other smart devices may be used by the user to communicate with and control the settings and operation of the controller 706, such as smart glasses, a smart headset, or a hand gesture device. In an example implementation, the user may select preferred light settings for the plurality of lighting elements 716 in accordance with various configurable scenarios. For instance, a user may prefer a particular brightness for the plurality of lighting elements 716 when the room containing a tree assembly 700 is dark (e.g., at night or on a cloudy day). Additionally, in another example, the user may prefer the power distribution to the plurality of lights 716 to activate when a human enters a room containing a tree assembly 700. In another example, the user may prefer the plurality of lighting elements to display a particular illumination sequence when the sensor device 704 detects a particular sound, such as a door opening or the voice of user. In an example implementation, the user can speak a certain phrase, such as "switch to red flashing lights," and the sensor device 704 can detect the sound thereby causing the controller 706 to initiate a red flashing light sequence. In another example implementation, a user may configure the controller 706 to adjust the plurality of lighting elements 716 to the user's preferred light settings when the user's mobile device is within sufficient proximity to the tree 702. For example, the user may configure the controller 706 to change the color of the plurality of lighting elements 716 to the user's favorite color light sequence when the controller 706 detects that the user's mobile device is within Bluetooth range. Additionally, a user may communicate a hierarchy of mobile devices to the controller 706, such that when multiple mobile devices with associated preferred light settings are in sufficient proximity to the tree 702, the controller 706 selects the light preferences according to the indicated hierarchy or switch between the preferences of the present users.

In an example implementation, the sensor device 704 may include an optical sensor that may be used to detect a luminous intensity of an ambient environment of the tree assembly 700. For example, the optical sensor in the sensor device 704 may detect when sunlight is present in a room during the day, and the controller 706 may control the light settings of the plurality of lighting elements 716 based on the intensity of the detected sunlight in the room containing the tree assembly 700. Alternatively, the optical sensor in the sensor device 704 may detect when no light is present in the room during the night and the controller 706 may control light settings of the plurality of lighting elements 716 based on the detected lack of light in the room containing the tree assembly 700. In certain example implementations, the controller 706 may deactivate the power distribution to the plurality of lighting elements 716 or adjust the brightness or color of the plurality of lighting elements 716 to a predetermined default setting after a time period in which the optical sensor 706 in the sensor device 704 detects no change to the luminous intensity of the ambient environment. In some embodiments, the controller 706 can deactivate power to the plurality of lighting elements in response to certain data from sensor device 704 or the lack of certain data from sensor device 704 for a predetermined time period.

In an example implementation, the sensor device 704 may include a motion sensor that may be used to detect motion around or near the tree assembly 700. For example, the optical sensor in the sensor device 704 may detect when a person enters the room containing the tree assembly 700. Alternatively, the optical sensor in the sensor device 704 may detect when no motion is present in the room and the controller 706 may control light settings of the plurality of lighting elements 716 based on the detected lack of motion in the room containing the tree assembly 700 for a certain timer period. In this example implementation, the controller 706 could turn off the lights when no motion is detected for a certain period. In certain example implementations, the controller 706 may deactivate the power distribution to the plurality of lighting elements 716 or adjust the brightness or color of the plurality of lighting elements 716 to a predetermined default setting after a time period in which the optical sensor 706 in the sensor device 704 detects no change to the luminous intensity of the ambient environment. In some embodiments, the controller 706 can deactivate power to the plurality of lighting elements in response to certain data from sensor device 704 or the lack of certain data from sensor device 704 for a predetermined time period.

One problem experienced with conventional decorative lighting devices is that the lighting elements can be perceived by users of the decorative lights as overly bright, potentially irritating and/or visually offensive. As an example of this problem, many users can perceive the more unidirectional light from a LED light source to be overly bright and uncomfortable to the eye in certain circumstances than the more omnidirectional light provided by an incandescent light source. Further, the user's perception of the brightness or intensity of the light from the lighting elements 716 can vary in relation to the amount of light in the ambient environment of the tree.

In some embodiments, the plurality of lighting elements 716 of the tree assembly 700 may appear brighter in a more dimly lit room than in a brightly lit room. In accordance with an example implementation, the controller 706 can rely in part on information from the sensor device 704 to set the intensity of light from the plurality of lighting elements 716 to a desired level of brightness for the user. The controller 706 can have certain default levels of light intensity according to the level of light in the room with the tree assembly 700. Additionally, in other embodiments, the levels of light intensity for the plurality of lighting elements 716 in relation to specific levels of ambient light can be configured by the user with the controller 706. For example, the environmental light conditions of the room with the tree assembly 700 can vary during the day, in accordance with some embodiments, the controller 706 can vary levels of light intensity of the plurality of lighting elements 716 in proportion to the amount of ambient light in the room with the tree assembly 700. In some embodiments, the mobile device application may communicate with the controller 706 and be configured by the user to automatically adjust the brightness of the plurality of lighting elements 716 in accordance with a certain level of ambient light in the room with the tree assembly 700. Accordingly, in some embodiments, the user can configure the controller 706 to avoid an experience in which the light from the plurality of lighting elements 716 is perceived as too bright or too dim. The controller 706 in some embodiments may automatically control the light from the plurality of lighting elements 716 in accordance with the desired lighting characteristics of the user.

In another example implementation, the sensor device 704 may include an audio sensor that may be used to detect sound in the ambient environment of the tree assembly 700. In accordance with an example implementation of the disclosed technology, the audio sensor in the sensor device 704 may detect a particular sound, and the controller 706 may control the light settings of the plurality of lighting elements 716 based on the sound in the room containing the tree assembly 700. For example, a user may configure the controller 706 to adjust the brightness of or display an illumination sequence on the plurality of lighting elements 716 when the audio sensor in the sensor device 704 detects a particular song. In another example, a user may configure the controller 706 to adjust the brightness of, display an illumination sequence on, or deactivate the power distribution to the plurality of lighting elements 716 when the audio sensor in the sensor device 704 detects a clapping sound in a room containing a tree assembly 700. In certain example implementations, the controller 706 may deactivate the power distribution to the plurality of lighting elements 716 or adjust the brightness or color of the plurality of lighting elements 716 to a predetermined default setting after a time period in which the audio sensor in the sensor device 704 does not detect a sound.

In another example implementation, the sensor device 704 may include a thermal or optical sensor that may be used to detect human movement in the ambient environment of the tree assembly 700. For example, the sensor device 704 may detect infrared radiation radiated by a human body. In accordance with an example implementation of the disclosed technology, the thermal or optical sensor in the sensor device 704 may detect human movement, and the controller 706 may control the light settings of the plurality of lighting elements 716 based on the detected human movement. For example, the thermal or optical sensor in the sensor device 704 may detect a person entering the room containing the tree assembly 700, and in response, the controller 706 may activate the power distribution to the plurality of lighting elements 716 on the tree 702. Alternatively, the thermal or optical sensor in the sensor device 704 may detect a person exiting the room containing the tree assembly 700, and in response, the controller 706 may deactivate the power distribution to the plurality of lighting elements 716 on the tree 702. In another example, the thermal or optical sensor in the sensor device 704 may detect a hand gesture, and in response, the controller 706 may activate or deactivate the power distribution to or display a desired illumination sequence selected from a plurality of illumination sequences on the plurality of lighting elements 716. In certain example implementations, the controller 706 may deactivate the power distribution to the plurality of lighting elements 716 or adjust the brightness or color of the plurality of lighting elements 716 to a predetermined default setting after a time period in which the thermal or optical sensor in the sensor device 704 does not detect a change in light or heat.

In another example implementation, the sensor device 704 may include a temperature sensor that may be used to measure and detect changes to the temperature of the ambient environment of the tree assembly 700. In accordance with an example implementation of the disclosed technology, the temperature sensor in the sensor device 704 may detect a temperature, and the controller 706 may control the light settings for the plurality of lighting elements 716 based on the temperature data received from the sensor device 704. For example, a user may configure the controller 706 to change the color of the plurality of lighting elements 716 to blue when the temperature in a room containing a tree assembly 700 is or drops below a particular temperature. In another example, a user may configure the controller 706 to deactivate the power distribution to the plurality of lighting elements when the temperature in a room containing a tree assembly 700 drops below a particular temperature.

In yet another example implementation, the controller 706 may control the light settings of the plurality of lighting elements 716 based on signal information received from a wireless device, such as a mobile phone, Bluetooth enabled device, infrared remote control, or similar device. For example, a user may use a mobile device to communicate with the controller 706 through Bluetooth and instruct the controller 706 to display an illumination sequence on or adjust the brightness of the plurality of lighting elements 716. In another example, the user may use an infrared remote control to communicate with the controller 706 and instruct the controller 706 to change the color of the plurality of lighting elements, initiate the display of a particular light sequence, or turn off the lighting elements 716. In certain example implementations, the controller 706 may deactivate the power distribution to the plurality of lighting elements 716 after a time period in which the controller 706 does not receive signal information from a wireless device.

In accordance with an example implementation of the disclosed technology, the tree assembly may include a power cord 712 to connect power from a power outlet 708 to a controller 706. In certain embodiments, the power cord 712 may include a conductor and a power plug. In other embodiments, a power adapter 710 may be used between the power outlet 708 and the controller 706, for example, to transform and/or rectify alternating current power received from the power outlet 708 and to provide power to the controller 706.

In accordance with an example implementation, the controller 706 may be modular—i.e., capable of being included as part of a larger controller. For instance, the controller 706 may be the lone controller containing all components necessary to control the tree assembly 700. In other embodiments, the controller 706 may be connected to an optional second controller 104 by a wire harness 714, in which case, the optional second controller 104 may provide at least power and ground to the plurality of lighting elements 716 and provide the central processing unit (CPU) for the tree assembly 700.

Figure 7B:
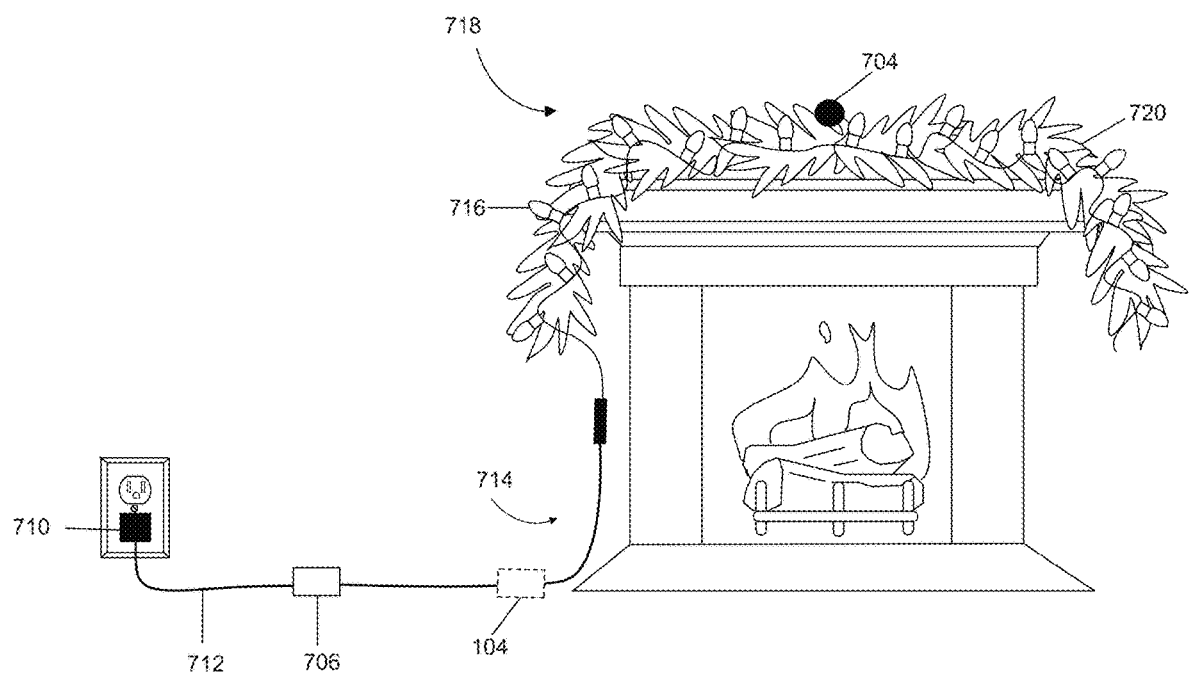
FIG. 7b illustrates garland having an installed decorative lighting system that includes a sensor device, in accordance with certain example implementations of the disclosed technology.

FIG. 7b illustrates an artificial garland assembly 718, according to an example implementation of the disclosed technology. Certain example implementations of the assembly 718 can include garland 720 having installed thereon a decorative lighting system having similar parts and capabilities as the decorative lighting system 700 described above for FIG. 7a. For instance, the garland assembly 718 may include the sensor device 704, controller 706, power adapter 710, power cord 712, wire harness 714, and plurality of lighting elements 716, as discussed above for the tree assembly 700. In certain example implementations, the section of the wiring harness 714 with the plurality of lighting elements 716 may be permanently secured to the garland 720 using any number attachment methods known to those of ordinary skill in the art. In other example implementations, the wiring harness 714 may be removeable from the garland 720, enabling a user to use the wiring harness 714 that includes the plurality of lighting elements 716 with other assemblies such as those discussed above for FIG. 7a and below for FIG. 7c. In certain implementations, the sensor device 704 may include an optical sensor, a thermal sensor, and/or an audio sensor, and each sensor may be positioned at a location on the garland 720 that permits accessible scanning of the ambient environment of the garland 720.

Figure 7C:
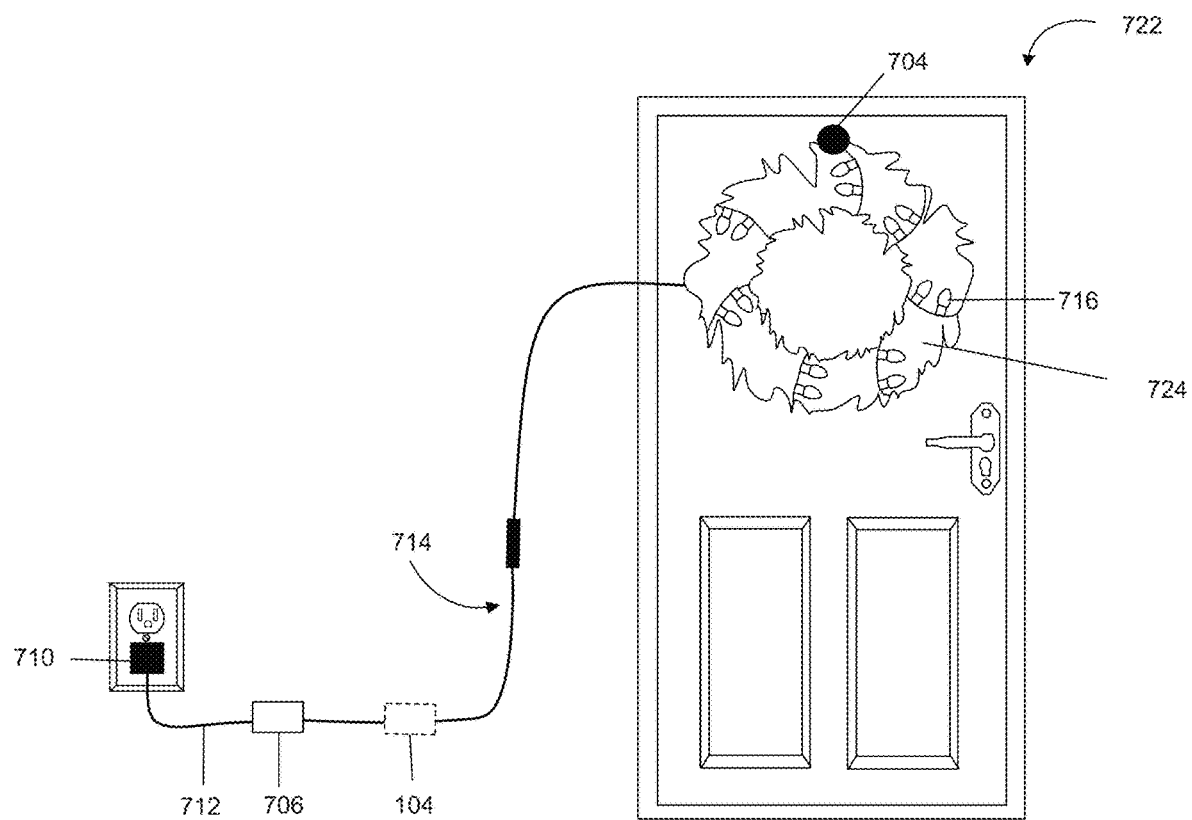
FIG. 7c illustrates a wreath having an installed decorative lighting system that includes a sensor device, in accordance with certain example implementations of the disclosed technology.

FIG. 7c illustrates an artificial wreath assembly 722, according to an example implementation of the disclosed technology. Certain example implementations of the assembly 722 can include a wreath 724 having installed thereon a decorative lighting system having similar parts and capabilities as the decorative lighting system 700 described above for FIG. 7a. For instance, the wreath assembly 722 may include the controller 706, power adapter 710, and power cord 712, wire harness 714, and plurality of lighting elements 716, as discussed above for the tree assembly 700. In certain example implementations, the section of the wiring harness 714 with the plurality of lighting elements 716 may be permanently secured to the wreath 724 using any number attachment methods known to those of ordinary skill in the art. In other example implementations, the wiring harness 714 may be removeable from the wreath 724, enabling a user to use the wiring harness 714 that includes the plurality of lighting elements 716 with other assemblies such as those discussed above for FIGS. 7a and 7b. In certain implementations, the sensor device 704 may include an optical sensor or thermal sensor positioned on the top half of the wreath 724 when the wreath is permanently positioned or positioned at another location on the wreath 724 that may permit accessible scanning of the ambient environment of the wreath 724. In other example implementations, the sensor device 704 may include an audio sensor positioned at a location on the wreath 724 that permits accessible scanning of the ambient environment of the wreath 724.

Figure 8:
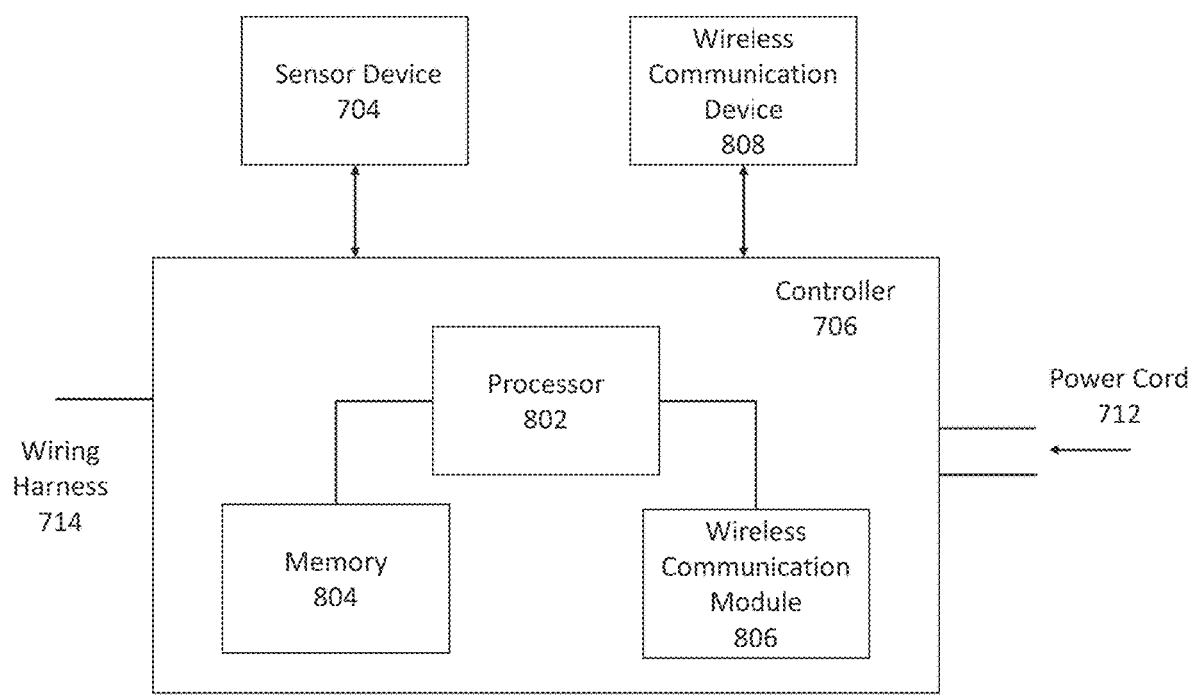
FIG. 8 is a block diagram of an example controller for use in a decorative lighting system, such as depicted in FIGS. 7a-7c.

FIG. 8 is a block diagram of an example controller 706 for use in a decorative lighting system, such as depicted in the decorative lighting systems 700, 718, and 722 shown in FIGS. 7a, 7b, and 7c, respectively. In accordance with an example implementation of the disclosed technology, the controller 706 may include a processor 802, a memory 804, and a wireless communication module 806. In certain example implementations, the processor 802 may communicate with the memory 804, the wireless communication module 806, or both.

As shown in FIG. 8, power may be supplied to the controller 706 by a power cord 712. As discussed above, the power cord 712 may provide alternating current that may need to be further transformed and/or rectified (e.g., by an optional power rectification). In another example implementation, the power cord 712 may provide the proper direct current for operation of the controller 706.

As shown in FIG. 8, the controller 706 may communicate with the sensor device 704 and the wireless communication device 808. In certain embodiments, the sensor device 704 may communicate with the controller 706 by a wired connection. In other embodiments, the sensor device 704 and the wireless communication device 808 may communicate wirelessly with the controller 706 by using any one or more wireless interconnection and communication technologies. For example, the controller 706 may contain a wireless communication module 806 to enable the communication of data from the sensor device 704 and/or the wireless communication device 808 to the controller 706. In certain example implementations, the wireless communication module 806 may be a Bluetooth module, a wireless local area network (WLAN) module, or a combination WLAN+Bluetooth module.

In accordance with an example implementation of the disclosed technology, the output of the controller 706 may be in communication with the wiring harness 714 for distributing power and/or control signals to the plurality of lighting elements 716. In another example implementation, the output of the controller 706 may be in communication with an optional second controller 104 for executing instructions sent to the optional second controller 104 by the controller 706.

Figure 9A:
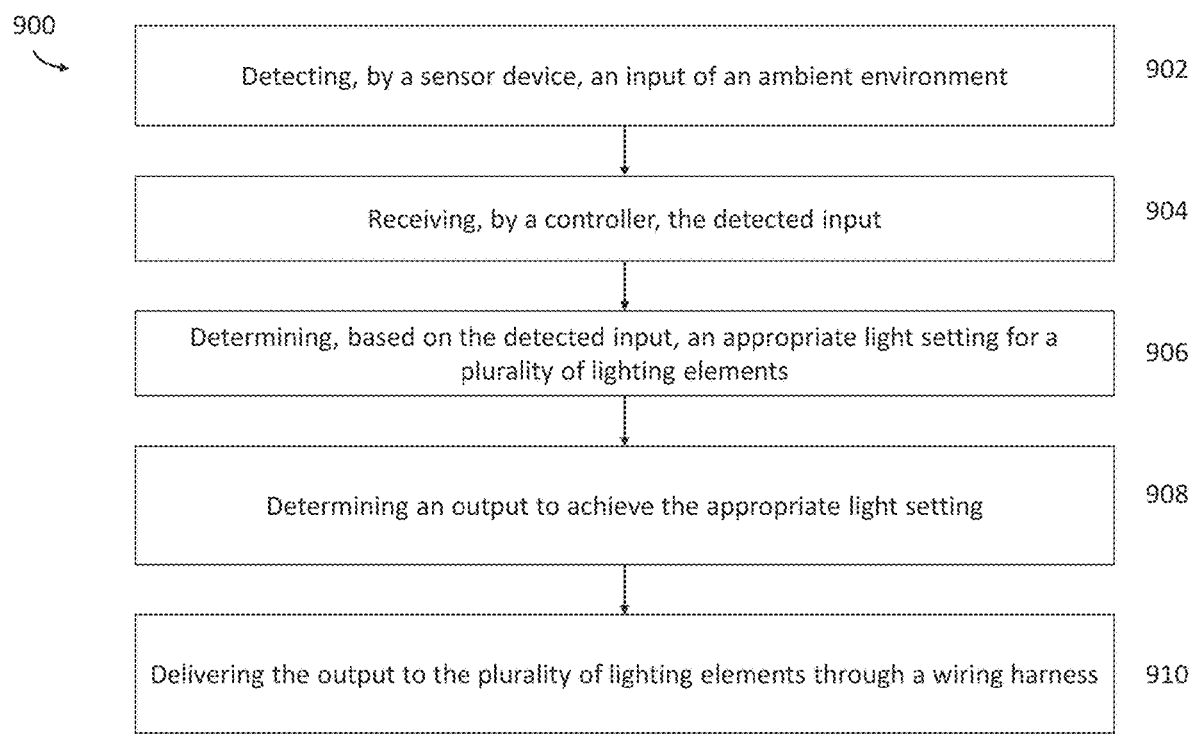
FIGS. 9a-9b are method flow diagrams, according to an example implementation of the disclosed technology.

FIG. 9a is a flow diagram of a method 900, according to an example implementation of the disclosed technology. The method 900 includes detecting 902, by a sensor device 704, an input from an ambient environment. For example, the input from the ambient environment may include a luminous intensity, a sound, a temperature, and/or a human movement. In certain example implementations, the frequency of detecting may be based on a default time interval. In other embodiments, the frequency of detecting may be selected by a user. For example, the user may use a wireless communication device to communicate the user's preferred frequency of detection with the sensor device 704 directly or with a controller 706, in which case the controller 706 may then communicate the user's preferred frequency of detection with the sensor device 704. Alternatively, the user may manually instruct the sensor device 704 to detect an input by, for example, using a wireless communication device to send instructions to the sensor device 704 directly or to the controller 706, in which case the controller 706 may prompt the sensor device 704 to detect the instructed input from the ambient environment.

The method 900 can further include receiving 904, by a controller 706, the detected input. The detected input may be any one or a combination of inputs. For example, the detected input may be a luminous intensity, a sound, a temperature, and/or a human movement.

Additionally, the method 900 can include determining, based on the detected input, an appropriate light setting 906 for a plurality of lighting elements 716. The appropriate light setting may be any one or a combination of light settings. For example, the appropriate light setting may be a brightness level, an illumination sequence, a light color, and/or power distribution activation or deactivation. The controller 706 may determine the appropriate light setting in a variety of ways. In certain example implementations, the appropriate light setting for any detected input may be a default light setting. For example, if the detected input is a luminous intensity, the appropriate light setting may be a default brightness level for the detected luminous intensity. In further example implementations, the appropriate light setting may be a light setting selected by a user from the wireless communication device 808 and stored in the memory 804. For example, a user may use a wireless communication device 808 to select an illumination sequence for a detected input, such as a song. In another example, a user may use a wireless communication device 808 to select a light color for a detected input, such as a human movement. In further example implementations, the appropriate light setting for any detected input may be continuously updated by a wireless feed to the controller 706. For example, the wireless feed may update the brightness level for any detected luminous intensity based on the time of day or year.

The method 900 may also include determining an output 908 to achieve the appropriate light setting. In certain example implementations, the output may be a particular voltage to achieve the appropriate light setting, and in other example implementations, the output may be a control signal. Finally, the method 900 can include delivering 910 the output to the plurality of lighting elements 716 through a wiring harness 714. In certain example implementations, the output delivered to the plurality of lighting elements 716 may be a voltage or a control signal.

Figure 9B:
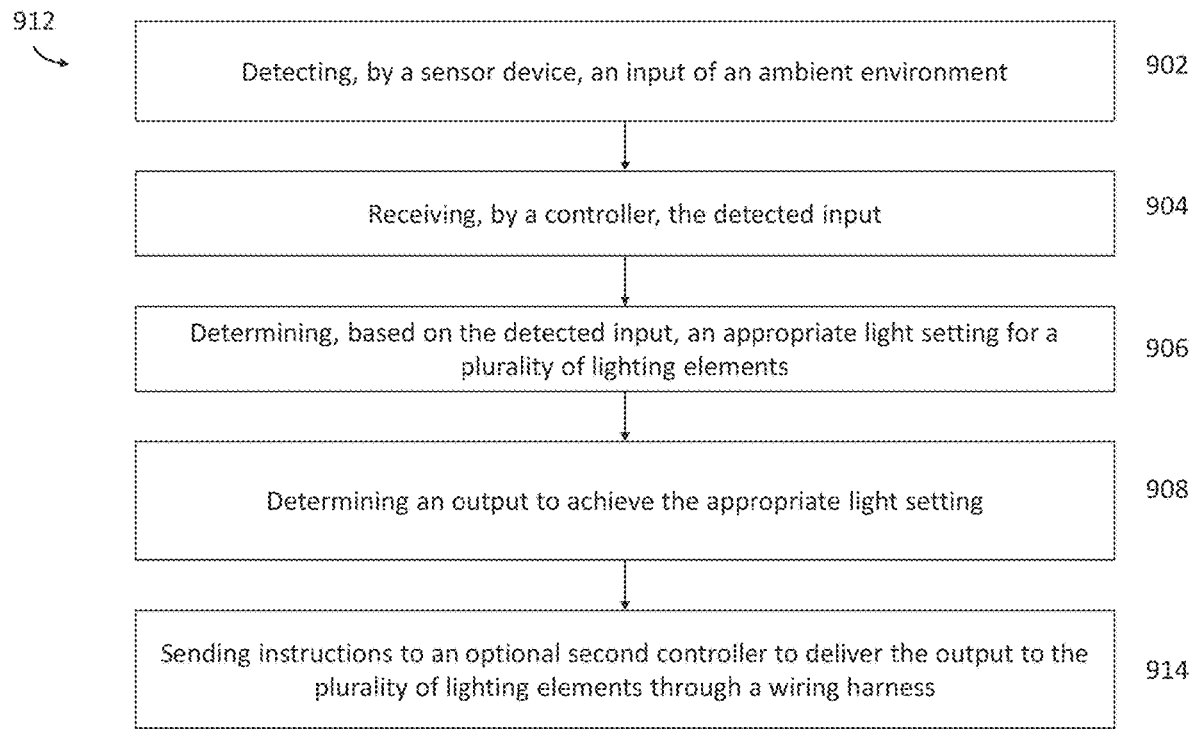

FIG. 9*b* is a flow diagram of a method 912, according to an example implementation of the disclosed technology. The method 912 includes steps 902, 904, 906, and 908 as described above for method 900. The method 912 also includes sending 914 instructions to an optional second controller 104 to deliver the output to the plurality of lighting elements through a wiring harness.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A decorative lighting system comprising:
a sensor device;
a wiring harness comprising an insulated conductor and a plurality of lighting elements;
a controller in communication with the wiring harness and the sensor device, the controller comprising a processor, a memory, and a wireless communication module; and
a mobile device configured with an application in communication with the controller;
wherein the controller is configured to control the plurality of lighting elements based at least in part on information received from the sensor device; and
wherein the application can be configured to control the operation of the plurality of lighting elements based at least in part on information received from the sensor device.

2. The decorative lighting system of claim 1, wherein the plurality of lighting elements are incandescent lights, LED lights, or fiber optic lights.

3. The decorative lighting system of claim 1, wherein the plurality of lighting elements comprise variable-color LED lights.

4. The decorative lighting system of claim 1, wherein the sensor device comprises an optical sensor.

5. The decorative lighting system of claim 1, wherein the sensor device comprises an audio sensor.

6. The decorative lighting system of claim 1, wherein the sensor device comprises a thermal sensor.

7. The decorative lighting system of claim 1, wherein the controller is configured to receive luminous intensity data from the sensor device.

8. The decorative lighting system of claim 1, wherein the controller is configured to receive human movement data from the sensor device.

9. The decorative lighting system of claim 1, wherein the controller is configured to receive thermal data from the sensor device.

10. The decorative lighting system of claim 1, wherein the controller is configured to adjust a voltage applied to the plurality of lighting elements through the wiring harness.

11. The decorative lighting system of claim 1, further comprising a wireless communication device in communication with the controller.

12. The decorative lighting system of claim 1, wherein the wiring harness is permanently secured to an artificial tree.

13. The decorative lighting system of claim 1, wherein the wiring harness is permanently secured to an artificial garland.

14. The decorative lighting system of claim 1, wherein the wiring harness is permanently secured to an artificial wreath.

15. A method of controlling the brightness of a decorative lighting system comprising:
detecting an input of an ambient environment;
receiving the detected input;
determining, based on the detected input, an appropriate light setting for a plurality of lighting elements;
determining an output to achieve the appropriate light setting; and delivering the output to the plurality of lighting elements,
wherein the determining, based on the detected input, an appropriate light setting comprises receiving, through a mobile device configured with an application, a preferred light setting of a first user when the mobile device is within predetermined wireless transmission range.

16. The method of claim 15, wherein the detected input comprises a luminous intensity.

17. The method of claim 15, wherein the detected input comprises a human movement.

18. The method of claim 15, wherein the detected input comprises a sound.

19. The method of claim 15, wherein the detected input comprises a temperature.

20. The method of claim 15, wherein the appropriate light setting comprises an illumination sequence.

21. The method of claim 15, wherein the appropriate light setting comprises a brightness level.

22. The method of claim 15, wherein determining, based on the detected input, an appropriate light setting comprises receiving, through a second mobile device, a preferred light setting of a second user.

23. The method of claim 22, wherein the determining an appropriate light setting comprises selecting the preferred light setting of the first user or the second user in accordance with a predetermined priority between the first user and the second user.

24. The method of claim 15, wherein the output is a voltage.

25. The method of claim 15, wherein the output is a control signal.

* * * * *